April 23, 1957 C. W. GLESNER 2,790,022
WASHER FOR USE IN PRIMARY CELLS
Filed March 21, 1956

INVENTOR.
Charles W. Glesner
BY
Griswold & Burdick
ATTORNEYS

United States Patent Office 2,790,022
Patented Apr. 23, 1957

2,790,022

WASHER FOR USE IN PRIMARY CELLS

Charles W. Glesner, Midland, Mich., assignor to The Dow Chemical Company, Midland, Mich., a corporation of Delaware Application March 21, 1956, Serial No. 573,047

5 Claims. (Cl. 136—177)

This invention relates to an improved primary cell of the dry or nonspillable type. It more particularly concerns primary cells of the foregoing type, the anode material of which is magnesium.

Dry cell formulations employing magnesium as the anode material are disclosed in a paper by R. C. Kirk and A. B. Fry, "Magnesium dry cells," published in the "Journal of the Electrochemical Society," vol. 94, No. 6, December 1948, pages 277 to 289, inclusive. In making up these cells, as mentioned in U. S. Patent 2,616,940, "the usual procedure is to form the anode material into a cup or 'battery can' which constitutes one of the electrodes of the cell as well as the container holding the cathode elements and electrolyte." The cathode mix consists of manganese dioxide having intimately mixed with it usually between about 5 and 15 percent of finely-divided carbon, such as acetylene black, by weight. The mixture is moistened with enough electrolyte to make it moldable and the moldable mixture is formed into "bobbins" around a central electrode in the form of a rod or carbon or graphite. These bobbins are simply cylindrical moldings somewhat smaller than the battery can and are inserted into the cans after they are lined with starch paste or gelled electrolyte or a porous nonconductor, such as cloth or paper, to keep the bobbin from touching the cam. In some instances, the cathode mix is introduced into the lined cans without previously forming the mix into a bobbin, the molding taking place in the lined can. In such instances, after placing the cathode mix in the can, the electrode of a carbon or graphite rod is pushed centrally into the cathode mix as the other electrode. Similar dry cell formulations are disclosed in U. S. Patents 2,547,907 and 2,547,908. U. S. Patent 2,616,940 discloses that in the cells having the foregoing formulations the can or cup lining may be dispensed with and the cathode mix may be placed directly against the inside of the can or cup in assembling the cell elements.

Dry cells formulated as above described (with or without lining the can) are usually sealed at the top by placing a cardboard or similar porous dielectric washer in the top of the can over the end of the carbon rod a short distance above the cathode mix and then a layer of sealing compound, such as a rosin-base sealing wax, coal tar or asphalt pitch, or mixtures thereof, is poured over the washer so as to fill the annular space at the top of the can above the washer.

One of the difficulties with cells having magnesium as the anode material and constructed as described is the problem of providing adequate venting of the hydrogen which is formed as the cell discharges. The rate of hydrogen evolution may reach as high as 23 cc. per minute, for example, for flashlight size (D) cells when short circuited. At usual current drains, the rate of hydrogen evolution in a D-size cell, for example, may be from about 0.5 to 4.5 cc. per minute. If the cell is not vented either the sealing compound will be cracked or forced out of the cell or the cell will bulge and leak due to the high gas pressure generated within the cell. If the sealing compound becomes cracked or breaks away from the wall of the can so that the hydrogen can escape excessive loss of moisture occurs which adversely affects the capacity and performance of the cell and generally lowers the voltage of the cell. The simple expedient of drilling a hole through the sealing compound to thereby provide a vent is open to the same objections. Other devices, such as partially sealed steel cell jackets which provide venting and prevent leakage and bulging, are difficult and expensive to produce.

In U. S. Patent No. 2,697,738, issued to Charles W. Glesner, the instant inventor, a simplifying departure is made in the sealing of the cell which overcomes the foregoing difficulties in that a cell closure is provided which allows adequate venting of hydrogen without excessive moisture loss and is simply and easily installed without elaborate machinery. The invention is based upon the principle of molding the sealing compound around a piece of a porous dielectric material extending through the sealing compound as a tab or extension of the dielectric washer. The piece of dielectric material is conventionally used in the top of the cell below the sealing compound so that the tab forms a gas permeable passageway through the sealing compound, the tab being permeable to hydrogen but not excessively permeable to water vapor. The vent tab of the Glesner patent is cut from the body of a paper washer having a central aperture, and in one embodiment the tab is cut inwardly from the periphery of the washer. As used in a primary cell the tab is bent sufficiently upward from the body of the washer to pass through the layer of sealing compound.

Although the above described Glesner vent tab performs its function in a very satisfactory manner, the raising of the tab upward from the body of the washer is a separate production operation prior to their actual assembly in a cell and adds to the cost of assembling the cell.

Further, when the tab is bent upward as a separate operation, there is always a chance that the tab will be bent downward during the assembly of the cell and will not extend completely through the sealing compound. If the cell is thus prevented from venting, the cell may be damaged, as previously mentioned.

Accordingly, a principal object of this invention is to provide an improved dielectric washer which contains a venting tab as an integral part thereof and in which the vent tab is adapted to be automatically raised to the desired height as the washer is assembled in the cell in which the washer is used.

In accordance with this invention there is provided a washer of dielectric material which is adapted to fit around a central axially disposed rod-like member in a primary cell, the washer having a venting tab as an integral part thereof. The venting part extends from the body of the washer into the central part of the washer through which the rod-like member is to pass, whereby the venting tab is raised as the washer is inserted over the rod-like member.

The invention, as well as additional objects and advantages thereof, will best be understood when the following detailed description is read in connection with the accompanying drawing, in which.

Figure 1:
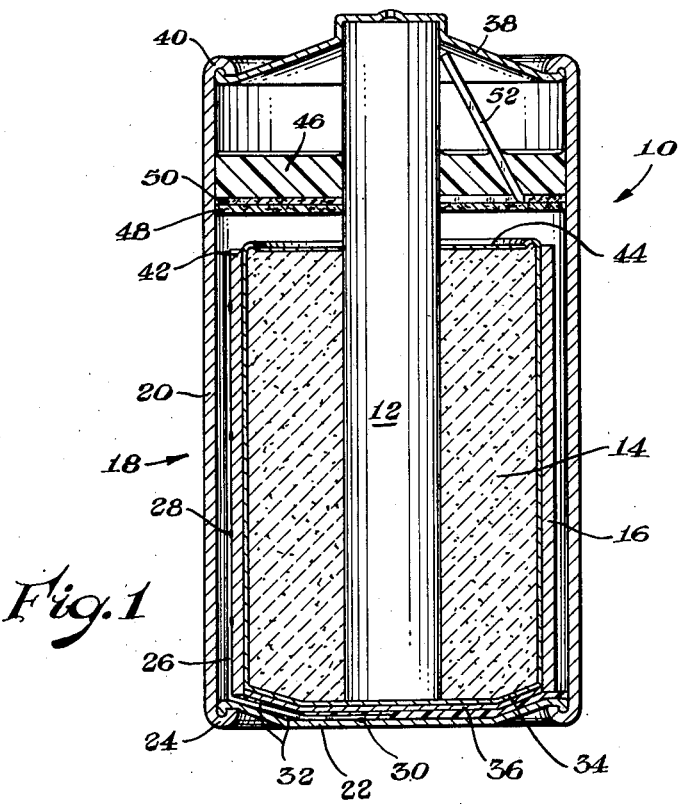
Fig. 1 is a sectional elevational view showing a washer and vent tab made in accordance with this invention.

Referring to the drawings, there is shown a primary cell, indicated generally by the numeral 10, comprising a cathode electrode 12, cathode mix 14 including electrolyte, and a magnesium anode 16. The anode 16 may, if desired, be made of tubular stock. The anode 16, cathode mix 14, and cathode 12 are disposed within a can, indicated generally by the numeral 18, which has a vapor proof side wall 20 of suitable insulating material and a metal bottom plate 22. The side wall 20 and bottom plate 22 are joined by a rolled-in, vapor resistant seal 24. The anode 16 is electrically connected to the bottom plate 22 by means of a metallic strip 26 which is welded (at 28) to the anode and (at 30) to the bottom plate 24.

The bottom of the interior of the can 18 is coated with an insulating material 32, such as grease, tar, oil or lacquer, in order to better isolate the metal plate 22 from the cathode mix 14 and to enhance the vapor seal 24. The cathode mix 14 is contained in a separator bag 34, as of paper, which fits within the anode 16 and rests on a washer 36 of insulating material such as paper, and on the insulating material 32 at the bottom of the can 18. The cathode electrode 12, which is a carbon or graphite rod disposed within the cathode mix 14, is axially disposed with respect to the can 18. The lower end of the electrode rod 12 lies against the bottom of the bag 34 and is insulated from the bottom plate 22 of the can or cup 18 by the bag 34, washer 36 and the coating 32 of grease, tar, lacquer, or oil.

The top of the cathode terminal electrode 12 is held in position by a somewhat hat-shaped cover plate 38 whose periphery is sealed to the upper end of the can 18 by a rolled-in seal 40.

The magnesium anode 16 extends about ⅔ of the length of the can 18 and fits loosely within the can 18.

The cathode mix 14 extends between the carbon rod 12 and the anode 16. The mix 14 is in direct contact with the carbon rod 12 but is separated from direct contact with the anode 16 by the paper bag 34 in which the mix 14 is contained. The cathode mix 14 extends to or near to the top 42 of the anode 16, and the upper wall 44 of the paper separator bag 34 is turned in towards the carbon rod 12 to help prevent the spilling of cathode mix 14 directly onto the anode 16.

A tar seal 46 is provided between the carbon rod 12 and the can 22. An apertured washer 48 of dielectric material is fitted between the carbon rod 12 and the can 18 to center the electrode 12 and to provide the base on which the tar seal 46 is poured.

In accordance with the invention, a second dielectric washer 50 is disposed on top of the washer 48. The washer 50 has as an integral part thereof a tab 52 which extends upwardly through the tar seal 46.

Figure 2:
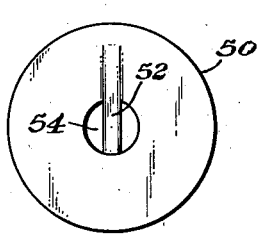
Fig. 2 is a plan view of a washer having a vent tab in accordance with this invention, the vent tab being in the unraised position.
Figure 3:
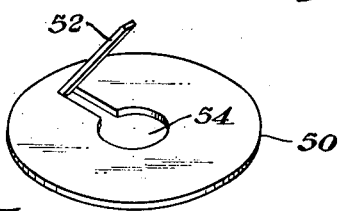
Fig. 3 is an isometric view of the washer shown in Fig. 2 with the vent tab raised.

Referring to Figures 2 and 3, as well as to Fig. 1, the washer 50 may be seen to comprise a wafer of dielectric material, such as paper, having a tab 52 which, in its unraised position, extends from the body of the wafer into the central cut-out section 54 through which the rod-like cathode 12 extends when the washer 50 is incorporated as a part of a primary cell 10.

Because the tab 52 extends into the central cut-out section 54, the tab 52 is automatically raised into its operating position as the washer 50 is inserted over and around the cathode electrode 12. Also, since the tab 52 rests against the cathode electrode 12 when the washer 50 is in its operating position in the cell 10, the tab 52 may not be accidentally flattened against the washer 50 and thus not extend through the tar seal 46.

Since the tar seal 46 adheres to the inside of the can 18 and to the cathode electrode 12 and the remainder of the cell is seated, the vent tab 52 provides the only path through which hydrogen generated within the cell 10 as it discharges may escape.

Figure 4:
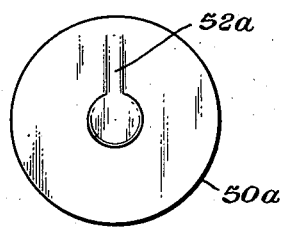
Fig. 4 is a plan view of an alternative washer having a vent tab in accordance with this invention, and with the vent tab in the unraised position.
Figure 5:
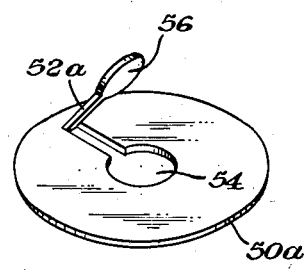
Fig. 5 is an isometric view of the tab shown in Fig. 4 with the vent tab shown in the raised position.

In the embodiment of the invention shown in Figs. 4 and 5, the end of the vent tab 52a includes the dielectric (usually paper) material which is often cut out and removed as the central opening 54 (to accommodate the cathode electrode 12) is made. The arrangement shown in Fig. 5 permits the use of a simpler die (not shown) in the stamping of the washers 50a. The rounded end 56 of the tab 52a does not adversely affect the operation of the vent tab 52a.

In practice, the tar seal 46 is "torched," as by applying to it the flame of a torch, during the making of the cell 10 to assure a good seal with a smooth surface, and the part of the vent tab 52 or 52a which extends above the seal 46 is often thereby burned away.

A space between the top of the anode 16 and the seal 46 as shown is needed because gases (principally hydrogen) may be generated within the cell 10 at a faster rate than the rate at which they may be vented through the tab 52 or 52a. The additional space between the tar seal 46 and the cover plate 38 is provided in order that a specific cell dimension may be maintained, e. g., a standard length flashlight cell as established for zinc anode type cells.

Formulations of suitable electrolytes and dry mixes for dry cells having magnesium for the anode material are disclosed in the aforementioned U. S. Patents 2,547,907, 2,547,908, 2,606,940, and paper by Kirk and Fry.

In a specific example of washer 50 made in accordance with this invention, the washer is 1¼ inches in diameter, the central opening is about 5/16 inch in diameter, the minimum width of the tab 52 is about 1/16 inch, and the length of the tab is about ½ the diameter of the washer 48. The thickness of the washer 48 is about 1/50 inch. Obviously, the dimensions of the washer 50 and tab 52 will vary in accordance with cell size and design.

I claim:

1. In a primary cell having a magnesium anode disposed in a battery can and electrically connected to an external surface of said can, a carbon cathode disposed in the can with one end projecting outwardly of the can beyond the rim, a cathode depolarizing mixture comprising manganese dioxide and carbon black moistened with an aqueous electrolyte, the said mixture being interposed between the inside of the anode and the carbon cathode below the rim of the can, and a moldable sealing compound molded in situ between the cathode and the wall of the cup to form a top seal for the cell, the improvement comprising a washer made of flexible dielectric body material and having a vent tab integral therewith, the washer having a central aperture, the periphery of said aperture being adapted to fit closely around said cathode, the outer periphery of the washer being adapted to fit closely within said can, the washer being a base on which said top seal is molded in situ, said vent tab extending from said washer into said central aperture whereby when said washer is placed over said cathode the vent tab will be raised and will lean against said cathode.

2. A washer for use in a primary cell including at least a can and an electrode which is centrally disposed therein, comprising a wafer of flexible material having a centrally disposed aperture therein and an integral vent tab which is adapted to be raised above said wafer when said washer is operatively disposed in a primary cell, said vent tab extending from said wafer into said aperture.

3. A washer in accordance with claim 2, wherein said vent tab is of rectangular transverse cross sectional configuration throughout its length.

4. A washer in accordance with claim 2, wherein the part of said vent tab which extends into said aperture is circularly shaped.

5. A washer in accordance with claim 2, wherein the periphery of said wafer is adapted to fit within said can in close fitting relationship therewith, the periphery of the aperture being adapted to fit closely around said electrode.

No references cited.